(12) United States Patent
Lin et al.

(10) Patent No.: US 8,760,099 B2
(45) Date of Patent: Jun. 24, 2014

(54) SENSORLESS MOTOR APPARATUS, BACK EMF DETECTOR AND DETECTION METHOD THEREOF

(75) Inventors: Yi-Chi Lin, Taichung (TW); Chih-Ping Yin, New Taipei (TW); Shih-Jen Yang, New Taipei (TW)

(73) Assignee: System General Corp., New Taipei (TW)

( * ) Notice: Subject to any disclaimer, the term of this patent is extended or adjusted under 35 U.S.C. 154(b) by 109 days.

(21) Appl. No.: 13/563,701

(22) Filed: Jul. 31, 2012

(65) Prior Publication Data
US 2014/0035500 A1 Feb. 6, 2014

(51) Int. Cl.
*H02P 6/18* (2006.01)
*H02P 6/08* (2006.01)

(52) U.S. Cl.
CPC .................................... *H02P 6/085* (2013.01)
USPC ............ 318/400.34; 318/400.32; 318/400.01; 318/700

(58) Field of Classification Search
CPC ................................ H02P 6/182; H02P 6/085
USPC ................... 318/400.34, 400.32, 400.01, 700
See application file for complete search history.

(56) References Cited

U.S. PATENT DOCUMENTS 6,094,022 A * 7/2000 Schillaci et al. ......... 318/400.35

* cited by examiner

*Primary Examiner* — David Luo
(74) *Attorney, Agent, or Firm* — Jianq Chyun IP Office

(57) ABSTRACT

A back electromotive force (EMF) detector for a motor is disclosed. The back EMF detector includes an upper switch, a lower switch, a current sensing resistor and a first to third resistance providers. The upper and lower switches are controlled by a first and a second control signal respectively. The current sensing resistor coupled between the lower switch and a reference ground voltage. A first terminal of the first resistance provider coupled to the upper switch, and a back EMF detection result is generated at a second terminal of the first resistance provider. The second resistance provider coupled between the reference ground voltage and the first resistance provider. The third resistance provider is coupled between the coupled terminal of the first and second resistance provider and the lower switch. Wherein, the first to the third resistance providers are determined by at least one characteristic parameter of the motor.

23 Claims, 4 Drawing Sheets

SENSORLESS MOTOR APPARATUS, BACK EMF DETECTOR AND DETECTION METHOD THEREOF

BACKGROUND OF THE INVENTION

1. Field of the Invention

The present invention generally relates to a sensorless motor apparatus, in particular, to a back electromotive force (EMF) detector of a sensorless motor apparatus.

2. Description of Related Art

In the prior art, in order to achieve the disposition of a sensorless motor apparatus, the deduction of the state of a rotor of the motor is an important subject. It is a common practice to convert a virtual sensing signal of the motor rotor through a back EMF of a motor.

In the prior art, the virtual sensing signal is obtained through an operation performed by using parameters of the motor in combination with multiple electrical and mechanic properties of the motor in operation. In this calculation manner, in addition to a look up table (LUT) of a certain size, some complicated operations are required. In order to deal with such calculation requirements, a high-efficiency processor (for example, a Digital Signal Processor, DSP) is essential. That is to say, the cost for disposing the sensorless motor apparatus is accordingly increased, thus correspondingly lowering the competition of the product.

SUMMARY OF THE INVENTION

Accordingly, the present invention is directed to a back EMF detector for a motor, so as to obtain a back EMF detection result through simple and efficient detection.

The present invention provides a sensorless motor apparatus, so as to obtain a back EMF detection result through simple and efficient detection by a back EMF detector.

The present invention provides a method for detecting a back EMF for a motor, so as to obtain a back EMF detection result through simple and efficient detection.

The present invention provides a back EMF detector for a motor, which includes an upper switch, a lower switch, a current sensing resistor, and a first to third resistance providers. The upper switch includes a first terminal coupled to a reference voltage source and a second terminal coupled to one of driving voltages, and is controlled by a first control signal. The lower switch includes a first terminal coupled to the second terminal of the upper switch and is controlled by a second control signal. The current sensing resistor is connected between a second terminal of the lower switch and a reference ground voltage. The first resistance provider includes a first terminal coupled to the second terminal of the upper switch and a second terminal generating a back EMF detection result. The second resistance provider is serially connected between the second terminal of the first resistance provider and the reference ground voltage. The third resistance provider is connected between a coupled terminal of the first and second resistance providers and the second terminal of the lower switch. Resistance values of the first to third resistance providers are determined by at least one characteristic parameter of the motor.

The present invention further provides a sensorless apparatus for a motor, which includes a plurality of back EMF detectors and a virtual sensing signal generator. The back EMF detectors respectively receive multiple driving voltages, and each includes an upper switch, a lower switch, a current sensing resistor, and a first to third resistance providers. The upper switch includes a first terminal coupled to a reference voltage source and a second terminal coupled to one of the driving voltages, and is controlled by a first control signal. The lower switch includes a first terminal coupled to the second terminal of the upper switch and is controlled by a second control signal. The current sensing resistor is connected between a second terminal of the lower switch and a reference ground voltage. The first resistance provider includes a first terminal coupled to the second terminal of the upper switch and a second terminal generating a back EMF detection result. The second resistance provider is connected between the second terminal of the first resistance provider and the reference ground voltage. The third resistance provider is connected between a coupled terminal of the first and second resistance providers and the second terminal of the lower switch. Resistance values of the first to third resistance providers are determined by at least one characteristic parameter of the motor. Further, the virtual sensing signal generator is coupled to the back EMF detectors, and generates multiple virtual sensing signals according to the back EMF detection result correspondingly generated by the back EMF detectors.

The present invention further provides a method for detecting a back EMF for a motor, which includes: providing a driving voltage to a first resistance provider; providing a reference ground voltage to a second resistance provider; detecting a driving current flowing via a supply terminal from which the driving voltage is sourced and obtaining a current detection result; providing the current detection result to a third resistance provider, where the first to third resistance providers are jointly coupled to an output terminal; and measuring a voltage value at an output terminal to obtain a back EMF detection result. Resistance values of the first to third resistance providers are determined by at least one characteristic parameter of the motor.

Based on the above description, in the present invention, a simple circuit formed by the resistance providers is disposed, in which the resistance values of the first to third resistance providers are determined by at least one characteristic parameter of the motor. Then the driving voltages and the detection voltages generated based on the driving current flowing via the circuit formed by the resistance providers, and the back EMF detection results corresponding to the driving voltages are obtained at the output terminal of the circuit formed by the resistance providers. In this way, the back EMF does not need to detect through complicated computation by software and hardware any more, so that the cost demand of the sensorless motor apparatus can be effectively lowered.

In order to make the features and advantages of the present invention more comprehensible, the present invention is described in the following with reference to the embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
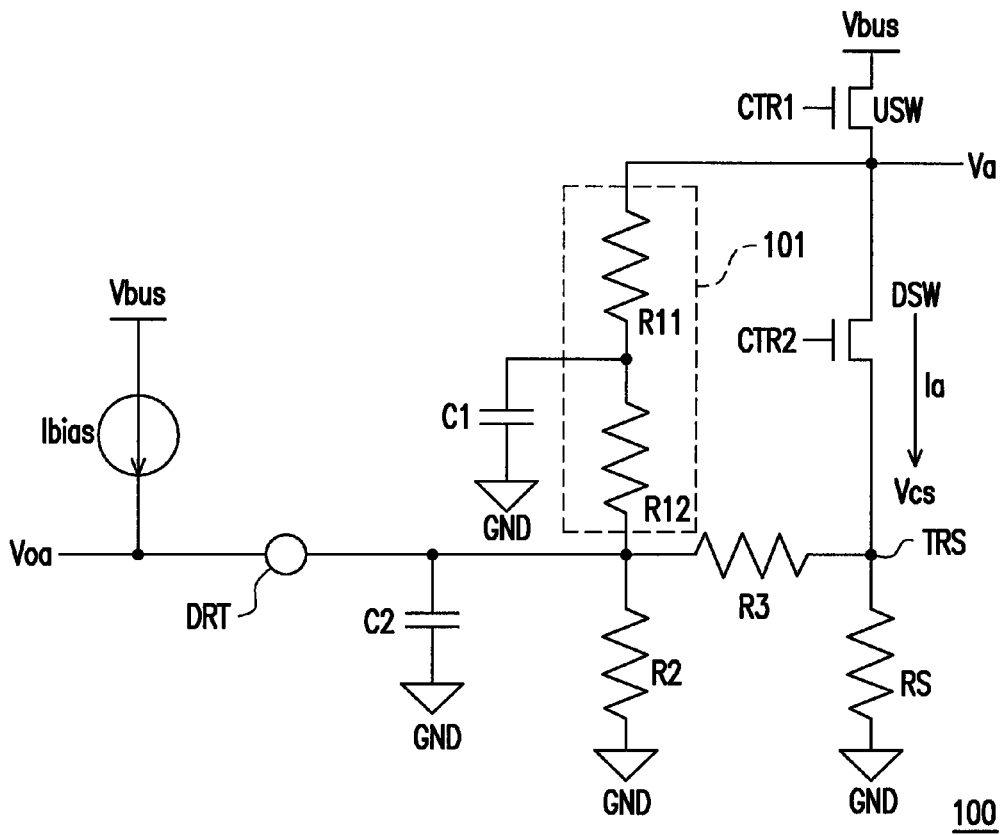
FIG. 1 is a schematic view of a back EMF detector 100 for a motor according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a back EMF detector 100 for a motor according to an embodiment of the present invention. Referring to FIG. 1, the back EMF detector 100 includes an upper switch USW, a lower switch DSW, a current sensing resistor RS, resistance providers 101, R2 and R3, a bias current source Ibias, and filter capacitors C1 and C2. The upper switch USW includes a first terminal coupled to a reference voltage source Vbus, and a second terminal coupled to a driving voltage Va, and is controlled by a control signal CTR1. The lower switch DSW includes a first terminal coupled to the second terminal of the upper switch USW, and is controlled by a control signal CTR2. The current sensing resistor RS is connected between a second terminal of the lower switch DSW and a reference ground voltage GND. The resistance provider 101 includes a first terminal coupled to the second terminal of the upper switch USW, and a second terminal (a terminal DRT) generating a back EMF detection result Voa. The resistance provider R2 is connected between the second terminal (a terminal DRT) of the resistance provider 101 and the reference ground voltage GND. The resistance provider R3 is connected between a coupled terminal (the terminal DRT) of the resistance providers 101 and R2 and a coupled terminal TRS of the lower switch DSW and the current sensing resistor RS. Resistance values of the resistance providers 101, R2 and R3 are determined by at least one characteristic parameter of the motor. The bias current source Ibias is coupled to the terminal DRT. The filter capacitors C1 and C2 are respectively coupled to the resistance provider 101 and the terminal DRT.

It should be noted that, calculation formulas (1)-(3) for a back EMF of the motor may be as shown below, in which a triphase back EMF is taken as an example:

$$EMFa + Vn = Va - Ia \times Rm - Lm\frac{dIa}{dT} \quad (1)$$

$$EMFb + Vn = Vb - Ib \times Rm - Lm\frac{dIb}{dT} \quad (2)$$

$$EMFc + Vn = Vc - Ic \times Rm - Lm\frac{dIc}{dT}, \quad (3)$$

where EMFa~EMFc are back EMFs corresponding to driving voltages Va~Vb of different phases, Ia~Ic are driving currents corresponding to the driving voltages Va~Vb of different phases, and Lm is an inductance of a rotor of the motor, and Vn is a medium voltage.

It should be noted that, in the above formulas (1)~(3), when a rotation rate of a rotor of the motor is within a specific range (for example, 4000 rpm-8000 rpm), the impact caused by the inductance Lm is very small and can be ignored, and thus the calculation formulas (1)~(3) can be converted into a calculation formula (4) as below:

$$EMFx + Vn = Vx - Ix \times Rm \quad (4),$$

where EMFx represents one of the back EMFs, such as EMFa~EMFc; Vx represents the corresponding driving voltages Va~Vc, and Ix represents the corresponding driving currents Ia~Ic.

Based on the above description, referring to FIG. 1 again, in the operation of the back EMF detector 100, the upper switch USW is conducted firstly according to the control signal CTR1, and the capacitors C1 and C2 which coupled to a coupled terminal of the upper switch USW and the lower switch DSW are charged according to the reference voltage source Vbus. At this time, the lower switch DSW is correspondingly disconnected according to the control signal CTR2. Then, the upper switch USW is disconnected according to the control signal CTR1, and the lower switch DSW is conducted according to the control signal CTR2. At this time, the driving current Ia is sourced from the driving voltage Va and flows via the lower switch DSW and the current sensing resistor RS.

Meanwhile, a current detection result Vcs equivalent to a product of the sensing resistor RS and the driving current Ia is generated at the coupled terminal TRS of the current sensing resistor RS and the lower switch DSW. Therefore, the back EMF detection result Vo can be obtained through a calculation formula (5) below:

$$Vo = Ibias \cdot (R1 // R2 // R3) + Vx \cdot \frac{R1 // R2 // R3}{R1} + VCS \cdot \frac{R1 // R2 // R3}{R1} \quad (5)$$

In the formula, R1 is equivalent to a resistance value provided by a resistance provider 101, and R1//R2//R3 is equivalent to a resistance value provided by the resistance providers 101, R2, and R3 connected in parallel. In addition, the bias current source Ibias provides a bias current to adjust a voltage level of the back EMF detection result Vo, so that the back EMF detection result Vo can be successfully received by a circuit subsequent to the back EMF detector 100 (for example, an analog-to-digital converter). However, it should be noted that, it is not necessary to adjust the voltage level of the back EMF detection result Vo. In case that the circuit subsequent to the back EMF detector 100 can receive and successfully convert the back EMF detection result Vo that is not adjusted by the bias current source Ibias, the bias current source Ibias can be removed.

In addition, the calculation formula (5) can be converted into a calculation formula (6) below:

$$Vo = Ibias \cdot Rt + Va \cdot \frac{Rt}{R1} - Ia \cdot Rs \cdot \frac{Rt}{R3}, \quad (6)$$

where $Rt = R1//R2//R3$.

According to the calculation formula (6), values of R1, R2 and R3 are set so that Rt/R1:Rt*Rs/R3=1:Rm. In this way, the calculation formula (6) can be converted into a calculation formula (7) below:

$$Vo - Vbias = Va - Ia \cdot Rm \quad (7),$$

where the voltage $Vbias = Ibias*Rt$.

Based on the calculation formulas (7) and (4), it can be simply known that, a sum of the back EMFa and the medium voltage Vn precisely equals to the back EMF detection result Vo generated by the back EMF detector 100 subtracting the voltage Vbias.

It should be noted that, the resistance provider 101 is formed by resistors R11 and R12 connected in series, the filter capacitor C1 is connected between a coupled terminal of the resistors R11 and R12 and the reference ground voltage GND. Herein, the resistor R11 and the filter capacitor C1 form a filter circuit to filter off noises on the driving voltage Va. Furthermore, the resistor R12 having a greater resistance value is further disposed in the resistance provider 101, to block current of the driving current Ia which is shunted to the resistance provider 101. In this embodiment, the resistance values of the resistors R11 and R12 are equal to about 1:100. Moreover, the filter capacitor C2 is connected between the terminal DRT and the reference ground voltage GND, for stabilizing the back EMF detection result Vo at the terminal DRT.

Figure 2:
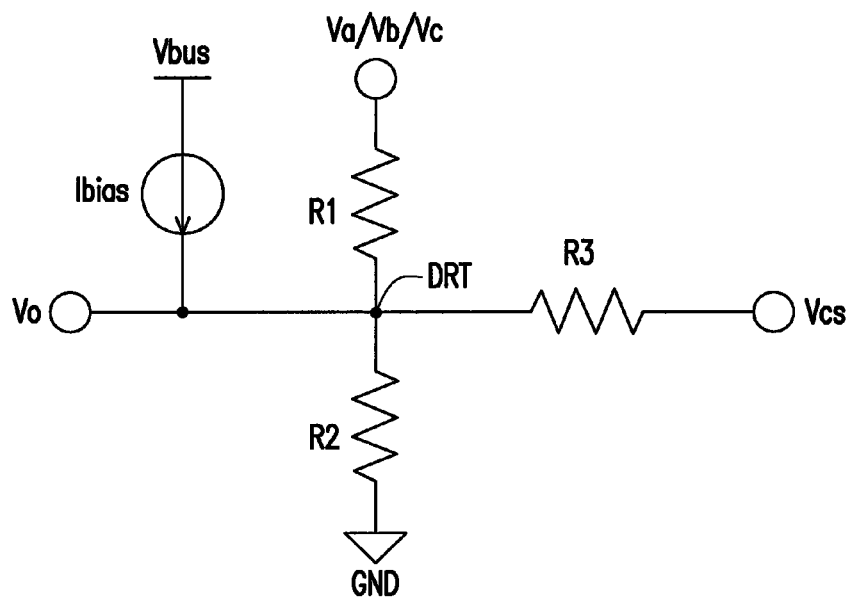
FIG. 2 is an equivalent circuit diagram of the back EMF detector 100 according to the embodiment of FIG. 1.

FIG. 2 is an equivalent circuit diagram of the back EMF detector 100 according to the embodiment of FIG. 1. Referring to FIG. 2, the calculation formula (5) can be further clarified through the equivalent circuit shown in FIG. 2, in which R1=a sum of the resistance values of the resistors R11 and R12.

Furthermore, in view of the setting of the values of R1, R2 and R3, because R1, R2 and R3 are set according to the relation Rt/R1:Rt*Rs/R3=1:Rm, the values of R1, R2 and R3 can be sequentially determined by setting Rt. For example, if the voltage of the reference voltage source Vbus equals to 310 V, the voltage Vbias equals to 1.0V, a bias current generated by the bias current source Ibias equals to 55 uA, and a maximum potential output voltage Vmax equals to 3.5V according to the back EMF detection result Vo, Rt equals to 1.0/55=181.818 kΩ, and R1 can be deduced from a calculation formula (8) below:

$$Vmax = Vbias + \frac{Rt}{R1} \cdot Vbus. \quad (8)$$

That is to say, R1 equals to 3300 kΩ. When a resistance Rm of the rotor equals to 25Ω, it can be deduced that R3 equals to 121 kΩ, and R2 equals to 21.5 kΩ. In addition, in case that the resistor R11: resistor R12=1:100, the resistance value of the resistor R11 may be set to 30 kΩ, and the resistance value of resistor R12 may be set to 3000 kΩ.

It can be known from the above description that, the back EMF of the motor can be simply and quickly obtained through the architecture of the back EMF detector 100, without complicated calculations. As for motors of different types, the required values of R1, R2, and R3 can be converted merely based on a characteristic parameter thereof (for example, equivalent resistance of the rotor), which are then substituted for the resistance values generated by the resistance providers 101, R2, and R3, so that the back EMF of the motor can be obtained by using the back EMF detector 100.

Figure 3:
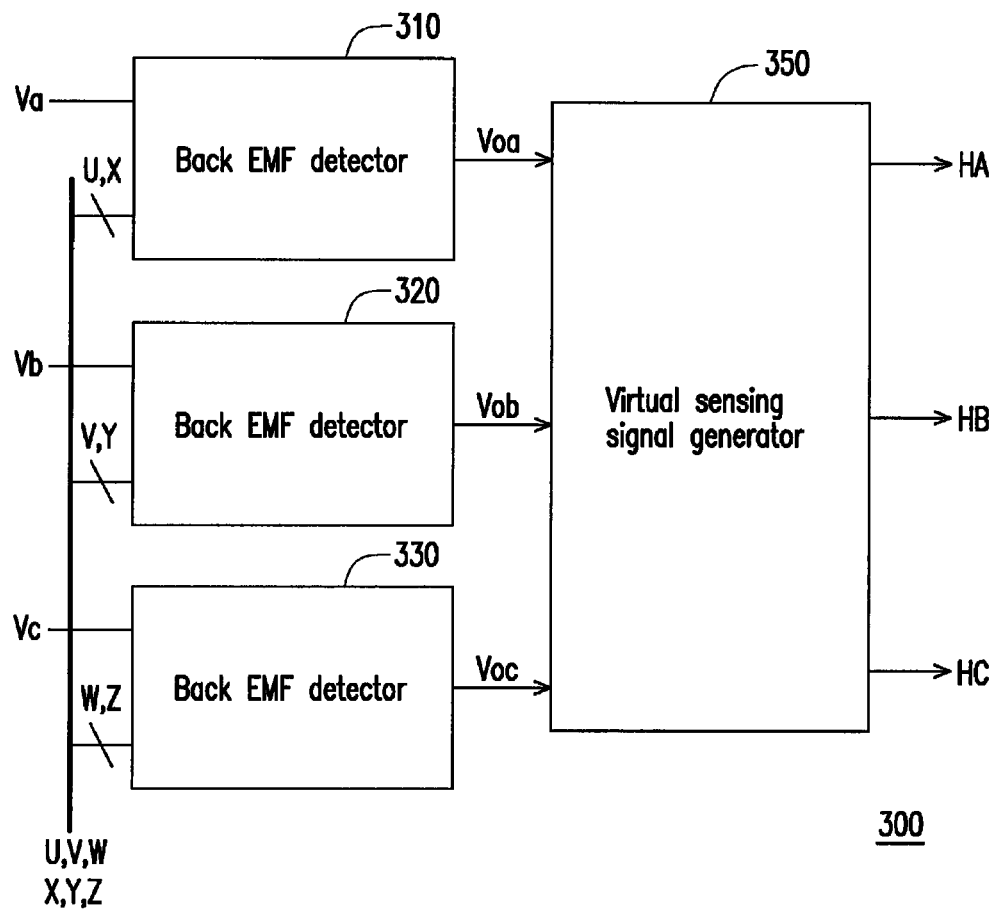
FIG. 3 is a schematic view of a sensorless motor apparatus 300 according to an embodiment of the present invention.

FIG. 3 is a schematic diagram of a sensorless motor apparatus 300 according to an embodiment of the present invention. Referring to FIG. 3, the sensorless motor apparatus 300 includes back EMF detectors 310, 320 and 330, and a virtual sensing signal generator 350. The virtual sensing signal generator 350 is coupled to the back EMF detectors 310, 320, and 330, and the back EMF detectors 310, 320 and 330 respectively receive driving voltages Va, Vb, and Vc. The back EMF detector 310 receives control signals U and X, the back EMF detector 320 receives control signals V and Y, and the back EMF detector 330 receives control signals W and Z. A phase difference between any two of driving voltages Va, Vb, and Vc is 120 degree, the control signals U and X are complementary, the control signals V and Y are complementary, and the control signals W and Z are complementary.

Circuit architecture of the back EMF detectors 310, 320, and 330 is the same as that in the embodiment shown in FIG. 1, which is not repeated hereafter again. The virtual sensing signal generator 350 receives back EMF detection results Voa, Vob, and Voc generated by the back EMF detectors 310, 320, and 330, and generates virtual sensing signals HA, HB, and HC according to the back EMF detection results Voa, Vob and Voc.

Figure 4:
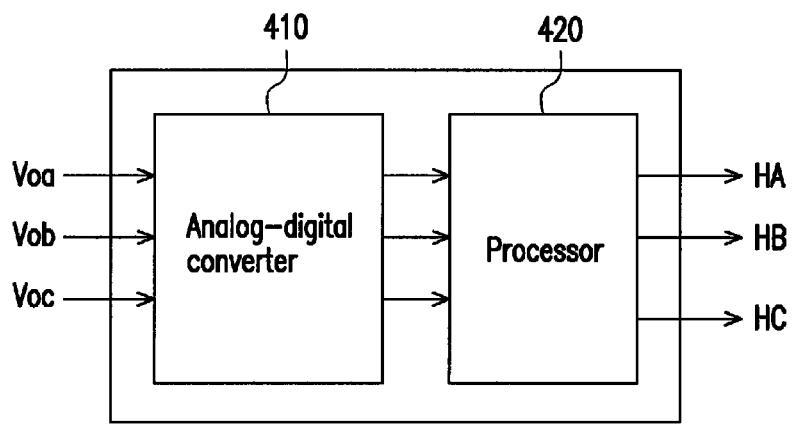
FIG. 4 and FIG. 5 illustrate different implementation manners of a virtual sensing signal generator 350.
Figure 5:
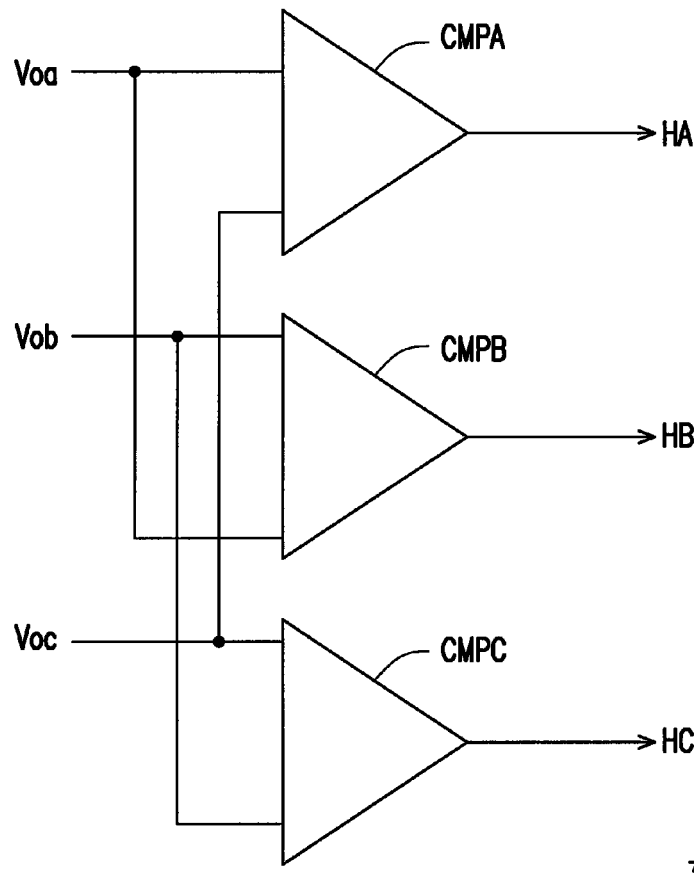
Figure 6:
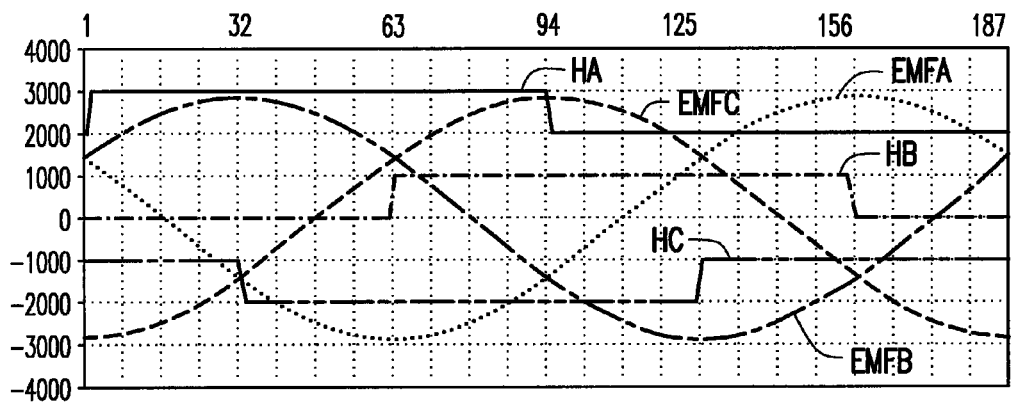
FIG. 6 is a diagram illustrating a relation between back EMF detection results Voa, Vob and Voc, and virtual sensing signals HA, HB and HC.

FIG. 4 and FIG. 5 illustrates different implementation manners of the virtual sensing signal generator 350, and FIG. 6 is a diagram illustrating a relation between the back EMF detection results Voa, Vob and Voc, and the virtual sensing signals HA, HB and HC. Referring to FIGS. 4, 5, and 6, it can be clearly known from FIG. 6 that, transition points of the virtual sensing signals HA, HB and HC all occur at intersected time points of any two of the back EMF detection results Voa, Vob and Voc. Therefore, in FIG. 4, the virtual sensing signal generator 350 includes an analog-to-digital converter 410 and a processor 420. The analog-to-digital converter 410 is coupled to the processor 420, receives the back EMF detection results Voa, Vob and Voc in an analog form, and converts the analog form into a digital form. The processor 420 receives the back EMF detection results Voa, Vob, and Voc in the digital form, and calculates waveforms of the virtual sensing signals HA, HB, and HC by points of any two of the back EMF detection results Voa, Vob, and Voc.

In FIG. 5, the virtual sensing signal generator 350 includes comparators CMPA, CMPB, and CMPC. The comparator CMPA receives the back EMF detection results Voa and Voc for comparison and thereby generates the virtual sensing signal HA, the comparator CMPB receives the back EMF detection results Vob and Voa for comparison and thereby generates the virtual sensing signal HB, and the comparator CMPC receives the back EMF detection results Vob and Voc for comparison and thereby generates the virtual sensing signal HC.

Figure 7:
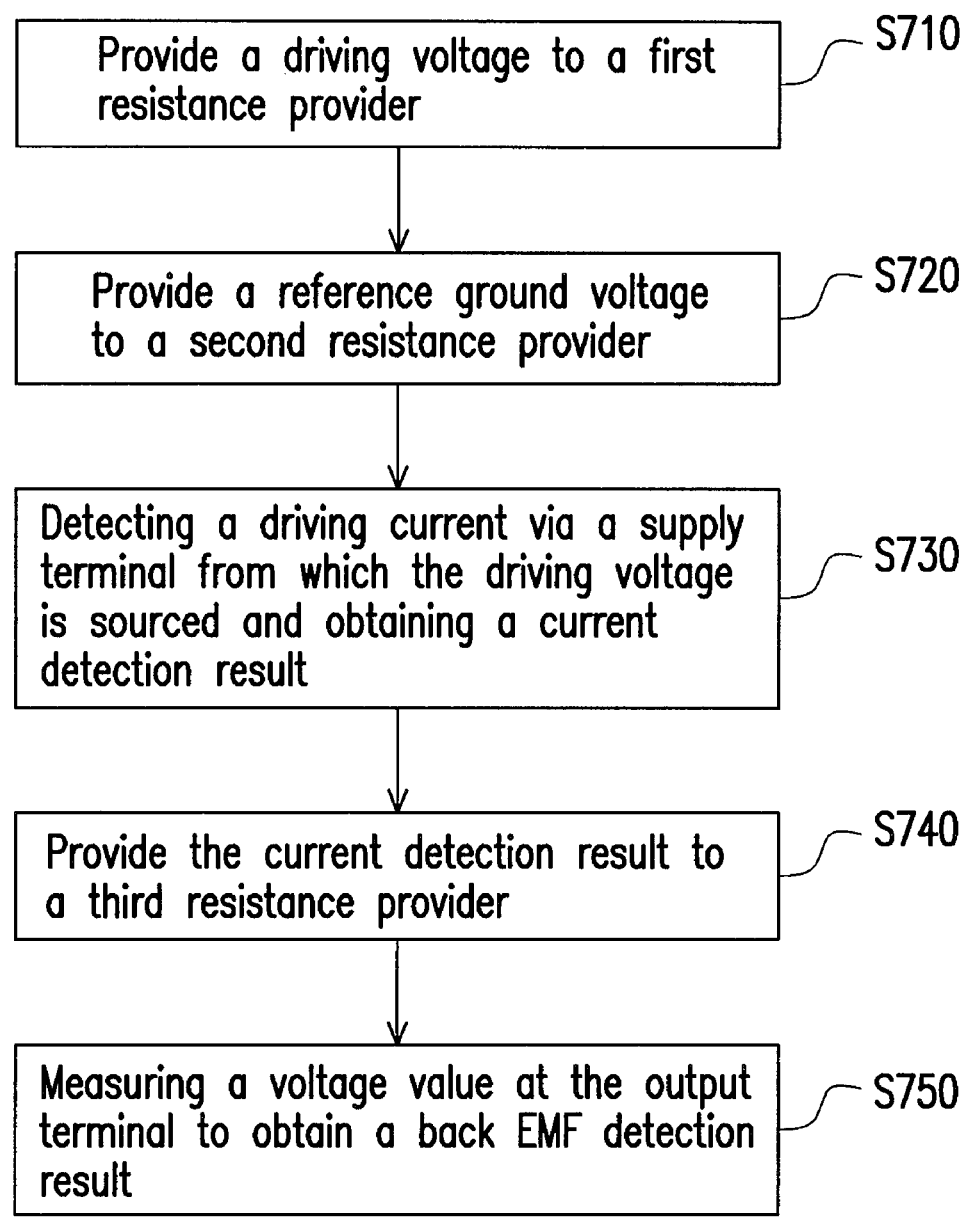
FIG. 7 illustrates a method for detecting a back EMF for a motor according to an embodiment of the present invention.

FIG. 7 illustrates a method for detecting a back EMF for a motor according to an embodiment of the present invention. The method includes: providing a driving voltage to a first resistance provider (S710); providing a reference ground voltage to a second resistance provider (S720); detecting a driving current flowing via a supply terminal from which the driving voltage is sourced and obtaining a current detection result (S730); providing the current detection result to a third resistance provider, where the first to third resistance providers are jointly coupled to an output terminal (S740); and measuring a voltage value at the output terminal to obtain a back EMF detection result (S750). Resistance values of the first to third resistance providers are determined by at least one characteristic parameter of a motor.

The implementation details of the method for detecting the back EMF according to the embodiment of the present invention are specifically described in the foregoing multiple embodiments and implementation manners, which are not further repeated herein again.

In summary, the back EMF detector is converted and constructed by using a characteristic coefficient of the motor, and then the back EMF detector is used to receive the output (the back EMF detection result) generated by the driving voltage, thereby obtaining the back EMF of the motor without complicated and precise calculations. In addition, by using the differences between multiple back EMF detection results detected by multiple back EMF detectors, the virtual sensing signal can be effectively converted and used in a sensorless motor apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back electromotive force (EMF) detector for a motor, comprising:
    an upper switch, comprising a first terminal coupled to a reference voltage source and a second terminal coupled to a driving voltage, and controlled by a first control signal;
    a lower switch, comprising a first terminal coupled to said second terminal of said upper switch and controlled by a second control signal;
    a current sensing resistor, serially connected between a second terminal of said lower switch and a reference ground voltage;
    a first resistance provider, comprising a first terminal coupled to said second terminal of said upper switch, and a back EMF detection result is generated at a second terminal of said first resistance provider;
    a second resistance provider, connected between said second terminal of said first resistance provider and said reference ground voltage; and
    a third resistance provider, connected between a coupled terminal of said first and second resistance providers, and said second terminal of said lower switch,
    wherein, resistance values of said first to third resistance providers are determined by at least one characteristic parameter of said motor.

2. The back EMF detector according to claim 1, further comprising:
    a bias current source, coupled between said reference voltage source and said second terminal of said first resistance provider, so that a voltage level of back EMF detection result is derived.

3. The back EMF detector according to claim 1, further comprising:
    a filter capacitor, coupled between said second terminal of said first resistance provider and said reference ground voltage.

4. The back EMF detector according to claim 1, wherein said first resistance provider comprises:
    a first resistor, comprising a first terminal coupled to said second terminal of said upper switch; and
    a second resistor, comprising a first terminal coupled to a second terminal of said first resistor and a second terminal generating said back EMF detection result,
    wherein, a resistance value of said first resistor is less than a resistance value of said second resistor.

5. The back EMF detector according to claim 4, wherein a proportion of the resistance value of said first resistor to the resistance value of said second resistor is 1:100.

6. The back EMF detector according to claim 4, further comprising:
    a filter capacitor, connected between said second terminal of said first resistor and said reference ground voltage.

7. The back EMF detector according to claim 1, wherein a conduction state of said upper switch is complementary with a conduction state of said lower switch.

8. The back EMF detector according to claim 1, wherein when said upper switch is disconnected and said lower switch is conducted, said back EMF detector outputs said back EMF detection result.

9. The back EMF detector according to claim 1, wherein said at least one characteristic parameter of said motor comprises an equivalent resistance of a rotor of said motor.

10. A sensorless apparatus for a motor, comprising:
    a plurality of back electromotive force (EMF) detectors, respectively receiving a plurality of driving voltages to generate a plurality of back EMF detection results, and each comprising:
        an upper switch, comprising a first terminal coupled to a reference voltage source and a second terminal coupled to one of said driving voltages, and controlled by a first control signal;
        a lower switch, comprising a first terminal coupled to said second terminal of said upper switch, and controlled by a second control signal;
        a current sensing resistor, connected between a second terminal of said lower switch and a reference ground voltage;
        a first resistance provider, comprising a first terminal coupled to said second terminal of said upper switch, and a back EMF detection result is generated at a second terminal of said first resistance provider;
        a second resistance provider, connected between said second terminal of said first resistance provider and said reference ground voltage; and
        a third resistance provider, connected between a coupled terminal of said first and second resistance providers and said second terminal of said lower switch,
        wherein, resistance values of said first to third resistance providers are determined by at least one characteristic parameter of said motor; and
    a virtual sensing signal generator, coupled to said back EMF detectors, and generating a plurality of virtual sensing signals according to said back EMF detection results correspondingly generated by said back EMF detectors.

11. The apparatus according to claim 10, wherein said virtual sensing signal generator comprises:
    an analog-to-digital converter, receiving said back EMF detection results, and generating said virtual sensing signals according to a difference between said back EMF detection results.

12. The apparatus according to claim 10, wherein said virtual sensing signal generator comprises:
    a plurality of comparators, each receiving two of said back EMF detection results for comparison, and thereby generating a corresponding virtual sensing signal.

13. The apparatus according to claim 10, wherein each of said back EMF detectors further comprises:
    a bias current source, coupled between said reference voltage source and said second terminal of said first resistance provider, and used for biasing a voltage level of said back EMF detection result.

14. The apparatus according to claim 13, wherein a proportion of said resistance value of said first resistor to said resistance value of said second resistor is 1:100.

15. The apparatus according to claim 13, wherein each of said back EMF detectors further comprises:
    a filter capacitor, connected between said second terminal of said first resistor and said reference ground voltage.

16. The apparatus according to claim 10, wherein each of said back EMF detectors further comprises:
    a filter capacitor, coupled between said second terminal of said first resistance provider and said reference ground voltage.

17. The apparatus according to claim 10, wherein said first resistance provider comprises:

a first resistor, comprising a first terminal coupled to said second terminal of said upper switch; and a second resistor, comprising a first terminal coupled to a second terminal of said first resistor and a second terminal generating said back EMF detection result, wherein, a resistance value of said first resistor is less than a resistance value of said second resistor.

18. The apparatus according to claim 10, a conduction state of said upper switch is complementary with a conduction state of said lower switch.

19. The apparatus according to claim 10, wherein when said upper switch is disconnected and said lower switch is conducted, said back EMF detector outputs said back EMF detection result.

20. The apparatus according to claim 10, wherein said at least one characteristic parameter comprises an equivalent resistance of a rotor of said motor.

21. A method for detecting a back electromotive force (EMF) for a motor, comprising:

providing a driving voltage to a first resistance provider;

providing a reference ground voltage to a second resistance provider;

detecting a driving current flowing via a supply terminal from which said driving voltage being sourced and obtaining a current detection result;

providing said current detection result to a third resistance provider, wherein said first to third resistance providers are jointly coupled to an output terminal; and measuring a voltage value at said output terminal to obtain a back EMF detection result, wherein, resistance values of said first to third resistance providers are determined by at least one characteristic parameter of said motor.

22. The method according to claim 21, further comprising:

providing a bias current to said output terminal, so that a voltage level of said back EMF detection result is derived.

23. The method according to claim 21, wherein said at least one characteristic parameter comprises an equivalent resistance of a rotor of said motor.

* * * * *